United States Patent
Ahn et al.

(10) Patent No.: US 10,818,907 B2
(45) Date of Patent: Oct. 27, 2020

(54) METHOD OF PREPARING SECONDARY BATTERY INCLUDING HIGH CAPACITY ELECTRODE

(71) Applicant: LG CHEM, LTD., Seoul (KR)

(72) Inventors: Ji Hee Ahn, Daejeon (KR); Eun Ju Lee, Daejeon (KR); Myung Ki Lee, Daejeon (KR); Joo Yong Song, Seongnam-si (KR); Hee Seok Jeong, Daejeon (KR)

(73) Assignee: LG Chem, Ltd. (KR)

( * ) Notice: Subject to any disclaimer, the term of this patent is extended or adjusted under 35 U.S.C. 154(b) by 129 days.

(21) Appl. No.: 15/770,699

(22) PCT Filed: Sep. 1, 2017

(86) PCT No.: PCT/KR2017/009595
§ 371 (c)(1),
(2) Date: Apr. 24, 2018

(87) PCT Pub. No.: WO2018/048143
PCT Pub. Date: Mar. 15, 2018

(65) Prior Publication Data
US 2019/0067674 A1    Feb. 28, 2019

(30) Foreign Application Priority Data

Sep. 9, 2016   (KR) .................. 10-2016-0116233
Aug. 24, 2017  (KR) .................. 10-2017-0107284

(51) Int. Cl.
  *H01M 4/04*    (2006.01)
  *H01M 4/139*   (2010.01)
  *H01M 10/0525* (2010.01)

(52) U.S. Cl.
  CPC ....... *H01M 4/0404* (2013.01); *H01M 4/0402* (2013.01); *H01M 4/0435* (2013.01);
(Continued)

(58) Field of Classification Search
  CPC ............ H01M 4/0404; H01M 4/0402; H01M 4/0435; H01M 4/0471; H01M 4/139; H01M 10/0525
  See application file for complete search history.

(56) References Cited

U.S. PATENT DOCUMENTS 8,999,587 B2    4/2015  Matsuda et al.
2007/0020385 A1* 1/2007  Naoi ................... H01M 4/0404
                                                        427/58
(Continued)

FOREIGN PATENT DOCUMENTS

JP    2008-98038 A    4/2008
JP    2014-60014 A    4/2014
(Continued)

OTHER PUBLICATIONS

Kim, KR 101647777, machine translation, originally published 2016, p. 1-13 (Year: 2016).*
(Continued)

*Primary Examiner* — Katherine A Bareford
*Assistant Examiner* — Christina D McClure
(74) *Attorney, Agent, or Firm* — Lerner, David, Littenberg, Krumholz & Mentlik, LLP (57) ABSTRACT

A method of preparing an electrode for a secondary battery including: (a) a process of partially coating an electrode slurry containing an electrode mixture and a solvent on an electrode sheet so that coated portions are positioned with an uncoated portion interposed therebetween; (b) a process of drying the coated portions to remove the solvent; and (c) a process of rolling the dried coated portions, wherein a thickness of the coated portion is decreased and the electrode mixture moves to the uncoated portions, resulting in the coated portions disappearing, in the process (c).

9 Claims, 5 Drawing Sheets

(52) U.S. Cl.
CPC ......... *H01M 4/0471* (2013.01); *H01M 4/139* (2013.01); *H01M 10/0525* (2013.01)

(56) References Cited

U.S. PATENT DOCUMENTS

| | | |
|---|---|---|
| 2011/0250501 A1 | 10/2011 | Uchida et al. |
| 2011/0274971 A1* | 11/2011 | Sakamoto ............... H01M 4/13 429/217 |
| 2011/0300440 A1 | 12/2011 | Matsuda et al. |
| 2013/0157136 A1 | 6/2013 | Balicki |
| 2013/0216910 A1* | 8/2013 | Obrovac ............... H01M 4/131 429/217 |
| 2014/0050977 A1 | 2/2014 | Sanada et al. |
| 2014/0315083 A1* | 10/2014 | Liu ....................... H01M 4/366 429/217 |
| 2014/0349170 A1 | 11/2014 | Kim et al. |
| 2015/0004475 A1* | 1/2015 | Jeon ...................... H01M 4/131 429/163 |
| 2017/0062798 A1* | 3/2017 | Wang ................. H01M 4/0419 |

FOREIGN PATENT DOCUMENTS

| | | |
|---|---|---|
| KR | 10-2011-0135306 A | 12/2011 |
| KR | 10-2013-0069432 A | 6/2013 |
| KR | 10-2013-0116828 A | 10/2013 |
| KR | 10-2015-0031257 A | 3/2015 |
| KR | 10-2015-0037399 A | 4/2015 |
| KR | 10-1647777 B1 | 8/2016 |

OTHER PUBLICATIONS

International Search Report issued in PCT/KR2017/009595 (PCT/ISA/210), dated Dec. 7, 2017.

* cited by examiner

METHOD OF PREPARING SECONDARY BATTERY INCLUDING HIGH CAPACITY ELECTRODE

TECHNICAL FIELD

The present disclosure relates to a method of preparing a secondary battery including a high-capacity electrode.

BACKGROUND ART

As the technical development of and the demand on mobile devices has increased, the demand on secondary batteries as energy sources has rapidly increased. Among such the secondary batteries, lithium secondary batteries, which have high energy density, high operating voltage, a long cycle lifespan, and a low self-discharge rate, have been commercially available and widely used.

Recently, in line with growing concerns about environmental issues, research into electric vehicles (EVs), hybrid EVs (HEVs), and the like which are able to replace vehicles using fossil fuels such as gasoline vehicles and diesel vehicles, which are one of major causes of air pollution, has been actively conducted. Although nickel metal hydride (Ni-MH) secondary batteries are mainly used as a power source for EVs, HEVs, and the like, research on the use of lithium secondary batteries having high energy density, high discharge voltage, and output stability has been actively conducted, and some lithium secondary batteries have been commercialized.

Lithium secondary batteries have a structure in which a non-aqueous electrolyte containing a lithium salt is impregnated in an electrode assembly in which a porous separator is interposed between positive and negative electrodes that are each prepared by coating an active material on an electrode current collector. Generally, each of the electrodes is prepared by mixing an active material and a binder resin component and dispersing the mixture in a solvent to prepare an electrode mixture, coating the electrode mixture on a surface of a current collector, and performing a rolling process, a drying process, a notching process, a slitting process, and the like.

On the other hand, as the demand for high-capacity battery cells has increased, a technique for increasing a loading amount of an electrode mixture has been developed and used. However, when such a large amount of the electrode mixture is coated, an electrode mixture layer on which the large amount of the electrode mixture is coated and a non-coated portion on which the electrode mixture is not coated have different rolling ratios in a rolling process performed after a coating process, and thus the non-coated portion may be bent during the rolling process or the electrode mixture layer is discharged from an electrode sheet, which is a problem.

Therefore, in order to lower a defect rate of an electrode at a time at which a high-load and high-capacity secondary battery is prepared, it is necessary to develop a new technique that can overcome problems in which a non-coated portion is bent or an electrode mixture layer is discharged from an electrode sheet.

DISCLOSURE

Technical Problem

The present disclosure is provided to solve the above-described problems of the related art and technical problems which have been identified in the past.

Specifically, the present disclosure provides a method of preparing an electrode that exhibits high productivity and improved capacity by minimizing a phenomenon in which an excessive stress is applied to an electrode mixture layer of coated portions so that the electrode mixture layer is discharged from an electrode sheet, and a phenomenon in which a rolling rate of an uncoated portion is relatively higher than that of the coated portion so that the uncoated portion is bent which occur in a rolling process during preparation of high capacity electrodes.

Technical Solution

In order to accomplish the above objects, the present disclosure provides a method of preparing an electrode for a secondary battery including: (a) a process of partially coating an electrode slurry containing an electrode mixture and a solvent on an electrode sheet so that coated portions are positioned with an uncoated portion interposed therebetween; (b) a process of drying the coated portions to remove the solvent; and (c) a process of rolling the dried coated portions, wherein a thickness of the coated portion is decreased and the electrode mixture moves to the uncoated portions, resulting in the coated portions disappearing, in the process (c).

That is, in the method of preparing an electrode for a secondary battery according to the present disclosure, the electrode slurry is partially coated so that the uncoated portion is formed between the coated portions, and then, during the rolling process, a part of the electrode mixture layer is pushed from the coated portions to fill the uncoated portion such that stress is dispersed. Accordingly, it is possible to remarkably reduce the chance of a defective electrode in which the electrode mixture layer of the coated portions is discharged from the electrode sheet being prepared. Generally, a problem in that the electrode is bent occurs due to a high rolling rate of an uncoated portion. However, according to the preparing method of the present disclosure, since a part of the electrode mixture layer of the coated portions moves to the uncoated portion, the electrode mixture fills the uncoated portion, and thus an electrode having an overall uniform thickness may be prepared. Accordingly, lithium ion conductivity of the electrode becomes uniform, a resistance decreases, and an electrode and secondary battery having improved capacity and lifespan characteristics may be prepared.

Here, a coating amount of the electrode mixture may be 4 mAh/cm$^2$ or more, and, more specifically, 5 mAh/cm$^2$ or more, in the electrode prepared by rolling in the process (c), the coating amount of the electrode mixture of the present disclosure can be about four times a coating amount in the preparation of an electrode in the related art or more.

Accordingly, an amount of an active material required for movement of lithium ions during a charge/discharge cycle per one electrode prepared according to the preparing method of the present disclosure is increased, and thus high capacity and improved cycle characteristics may be exhibited. Further, even when the electrode mixture is coated at a high amount of 4 mAh/cm$^2$ or 5 mAh/cm$^2$ or more, the above-mentioned preparing method may solve the problem of a defective electrode which may occur during the rolling.

In one specific example, specific pattern shapes may be formed by the uncoated portion in the process (a), and a plurality of coated portions having predetermined intervals or shapes due to the uncoated portion may be formed on the electrode sheet. Each of the uncoated portions serves as a buffer space so that the electrode mixture layer pushed during rolling is not discharged from the electrode sheet, as a result, a thickness of the coated portions at which rolling is completed may be constant, and an electrode having uniform quality may be prepared.

Here, the term "forming a pattern shape" means that the coated portions and the uncoated portions are present together on the electrode sheet, and the electrode slurry is partially coated to form a specific pattern thereon when the electrode sheet is viewed in a plan view and to form a concavo-convex shape when viewed from a side of the electrode sheet.

Patterns of the uncoated portion may have, for example, a straight line shape, a zigzag shape, a wave pattern shape, a lattice pattern shape, or a honeycomb shape on a plane, but are not limited thereto, and various patterns may be formed.

Pattern shapes of the uncoated portion are not particularly limited as long as shapes of all of the coated portions after rolling are allowed to be uniform, but may be, for example, triangular, square or hexagonal on a plane, and the pattern shapes may be determined by various coating materials or methods used to coat the electrode slurry on the electrodes.

In one specific example, in the process (a), a width of an uncoated portion at which a pattern shape disappears after rolling may be 10 μm to 300 μm, may more specifically be 50 μm to 200 μm, and may most preferably be 50 μm to 100 μm. When the width of the uncoated portion is less than 10 μm outside of the above preferable ranges, an originally intended buffering action may not be performed during rolling, which is not preferable. On the other hand, when the uncoated portion exceeds 300 μm, a pattern shape does not disappear locally even when the rolling is completed, and thus an electrode having uniform thickness or size may not be formed, which is also not preferable.

The method used in the coating process of the process (a) is not particularly limited as long as the method is a method of coating the electrode slurry so that the uncoated portion is allowed to form a specific pattern shape as described above, and it may be implemented through one method selected from the group consisting of, for example, nozzle scanning, die casting, comma coating, screen printing, and the like.

In one specific example, the preparing method may be performed in the order of the process (a) followed by the processes (b) and (c), or may be performed in the order of the processes (c) and (b), and is not particularly limited as long as the method is a method that the drying in the process (b) allows the solvent mixed in the mixture to rapidly move but does not cause chemical changes in the electrode mixture. Preferably, the drying process may be performed by hot air drying, by vacuum drying, or by mixing hot air drying and vacuum drying. After the drying process, a cooling process at room temperature may be further performed to stabilize the electrode mixture.

In particular, when the drying in the process (b) is performed before the process (c), the amount of the solvent to be dried and removed may be 20% to 60% by weight of the amount of the solvent initially added to prepare the electrode slurry, and may more specifically be 20% to 40% by weight, and thus, when an amount of the solvent within such ranges is removed, fluidity sufficient to push the electrode mixture layer to the uncoated portion in the rolling process of the process (c) may be secured, which is preferable.

In another specific example, in the process (c), a thickness of the electrode mixture layer in the uncoated portion which disappeared due to movement of the electrode mixture may be the thickness of the electrode mixture layer of the coated portion or less, and, more preferably, the thickness of the electrode mixture layer in the uncoated portion which disappeared due to movement of the electrode mixture may be the same as a thickness of an electrode mixture layer of a rolled coated portion. Therefore, the finally prepared electrode has an overall uniform thickness, and accordingly an impregnation rate of an electrolyte in each of the portions of the electrode and conductivity of lithium ions are also uniform, and thus charging and discharging efficiency of the secondary battery may be improved, which is preferable.

Further, the thickness of the electrode mixture layer of the coated portion rolled in the process (c) may be 100 μm to 300 μm. Here, when the thickness of the electrode mixture layer is less than 100 μm, the coating amount is decreased, and thus a high capacity and performance electrode may not be prepared, which is not preferable. When the thickness of the electrode mixture layer exceeds 300 μm, the thickness of the active material layer is too great, and thus an impregnating property of the electrolyte is lowered, which is also not preferable.

The present disclosure also provides an electrode prepared by the above-described preparing method, wherein the electrode for a secondary battery may be a positive electrode and/or a negative electrode.

According to the preparing method of the present disclosure, the positive electrode is prepared by coating a mixture of a positive electrode active material, a conductive material, and a binder on a positive electrode current collector so that an uncoated portion forms a predetermined pattern, and rolling and drying, and a filler may be further added to the mixture as necessary.

Examples of the positive electrode active material may include, for example, a layered compound of lithium cobalt oxide ($LiCoO_2$), lithium nickel oxide ($LiNiO_2$), etc. or a substituted compound with one or more transition metals; lithium manganese oxide such as $Li_{1+x}Mn_{2-x}O_4$ (in which x is 0 to 0.33), $LiMnO_3$, $LiMn_2O$, $LiMnO_2$, etc.; lithium copper oxide ($Li_2CuO_2$); vanadium oxide such as $LiV_3O_8$, $LiFe_3O_4$, $V_2O_5$, $CuZV_2O_7$, etc.; Ni site-type lithium nickel oxide represented by Chemical Formula of $LiNi1-xMxO_2$ (in which, M=Co, Mn, Al, Cu, Fe, Mg, B or Ga, x=0.01 to 0.3); lithium manganese complex oxide represented by Chemical Formula $LiMn_2-xMxO_2$ (in which M=Co, Ni, Fe, Cr, Zn or Ta, and x=0.01 to 0.1) or $Li_2Mn_3MO_8$ (in which, M=Fe, Co, Ni, Cu or Zn); $LiMn_2O_4$ in which a portion of Li is substituted with alkaline earth metal ions; a disulfide compound; $Fe_2(MoO_4)_3$, and the like. However, the present disclosure may not be limited thereof.

The conductive agent is generally added so that the conductive agent has 1 to 30 wt % based on the total weight of the compound including the positive electrode active material. The conductive agent is not particularly restricted so long as the conductive agent exhibits high conductivity while the conductive agent does not induce any chemical change in a battery to which the conductive agent is applied. For example, graphite, such as natural graphite or artificial graphite; carbon black, such as carbon black, acetylene black, Ketjen black, channel black, furnace black, lamp black, thermal black; conductive fiber, such as carbon fiber or metallic fiber; metallic powder, such as carbon fluoride powder, aluminum powder, or nickel powder; conductive whisker, such as zinc oxide or potassium titanate; conductive metal oxide, such as titanium oxide; or polyphenylene derivatives may be used as the conductive agent.

The binder is a component assisting in binding between the active material and conductive agent and in binding with the current collector. The binder is generally added in an amount of 1 to 30 wt % based on the total weight of the compound including the positive electrode active material.

As examples of the binder, there may be used polyvinylidene fluoride (PVdF), polyvinyl alcohol (PVA), carboxymethylcellulose (CMC), starch, hydroxypropylcellulose, regenerated cellulose, polyvinyl pyrollidone, tetrafluoroethylene, polyethylene, polypropylene, ethylene-propylene-diene terpolymer (EPDM), sulfonated EPDM, styrene butadiene rubber, fluoro rubber, and various copolymers.

The filler is an optional component used to inhibit expansion of the positive electrode. There is no particular limit to the filler so long as the filler does not cause chemical changes in a battery to which the filler is applied, and is made of a fibrous material. As examples of the filler, there may be used olefin polymers, such as polyethylene and polypropylene; and fibrous materials, such as glass fiber and carbon fiber.

According to the preparing method of the present disclosure, the negative electrode is prepared by coating a negative electrode active material on a negative electrode current collector so that an uncoated portion forms a predetermined pattern, and rolling and drying. As necessary, the above-described components may optionally be further included.

Examples of the negative electrode active material include carbon such as non-graphitized carbon or graphite carbon; a metal complex oxide such as $Li_xFe_2O_3$ ($0 \leq x \leq 1$), $Li_xWO_2$ ($\leq x \leq 1$), $Sn_xMe_{1-x}Me'_yO_z$ (Me: Mn, Fe, Pb, Ge; Me': Al, B, P, Si, elements in Group I, II, and III on the periodic table, a halogen; $0 < x \leq 1$); $1 \leq y \leq 3$; $1 \leq z \leq 8$), a lithium metal; a lithium alloy; a silicon-based alloy; a tin-based alloy; a metal oxide such as $SnO$, $SnO_2$, $PbO$, $PbO_2$, $Pb_2O_3$, $Pb_3O_4$, $GeO$, $GeO_2$, $Bi_2O_3$, or $Bi_2O_5$; a conductive polymer such as polyacetylene; a Li—Co—Ni-based material, or the like.

The electrolyte may be a non-aqueous electrolyte containing a lithium salt, and may be composed of a non-aqueous electrolyte and a lithium salt. A non-aqueous organic solvent, an organic solid electrolyte, an inorganic solid electrolyte, and the like may be used as the non-aqueous electrolyte, but the present disclosure is not limited thereto.

As examples of the non-aqueous organic solvent, mention may be made of non-protic organic solvents, such as N-methyl-2-pyrollidinone, propylene carbonate, ethylene carbonate, butylene carbonate, dimethyl carbonate, diethyl carbonate, gamma-butyro lactone, 1,2-dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

As examples of the organic solid electrolyte, mention may be made of polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

As examples of the inorganic solid electrolyte, mention may be made of nitrides, halides, and sulphates of lithium (Li), such as $Li_3N$, $LiI$, $Li_5NI_2$, $LiSiO_4$, $LiSiO_4$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$.

The lithium salt is a material that is readily soluble in the above-mentioned non-aqueous electrolyte, and may include, for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate, and imide.

In addition, in order to improve charge and discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the non-aqueous electrolytic solution. According to circumstances, in order to impart incombustibility, the non-aqueous electrolytic solution may further include halogen-containing solvents, such as carbon tetrachloride and ethylene trifluoride. Furthermore, in order to improve high-temperature storage characteristics, the non-aqueous electrolytic solution may further include carbon dioxide gas, and may further include fluoro-ethylene carbonate (FEC), propene sultone (PRS), etc.

In one specific example, a lithium salt such as $LiPF_6$, $LiClO_4$, $LiBF_4$, or $LiN(SO_2CF_3)_2$ is added to a mixed solvent of a cyclic carbonate such as ethylene carbonate (EC) or propylene carbonate (PC) which is a high-dielectric solvent and a linear carbonate such as diethyl carbonate (DEC), dimethyl carbonate (DMC) or ethylmethyl carbonate (EMC) which is a low-viscosity solvent to prepare a non-aqueous electrolyte containing a lithium salt.

Further, the present disclosure provides a secondary battery including an electrode for a secondary battery. The secondary battery is not particularly limited, but specific examples thereof include lithium secondary batteries such as Li-ion secondary batteries, Li-polymer secondary batteries, Li-ion polymer secondary batteries, or the like, which have advantages such as high energy density, discharge voltage, output stability, and the like.

The present disclosure also provides a battery pack including the secondary battery, and a device including the battery pack as a power source.

The device may be selected from a cell phone, a portable computer, a smart phone, a tablet PC, a smart pad, a netbook, a light electronic vehicle (LEV), an EV, a hybrid EV (HEV), a plug-in HEV, a power storage device, and the like. Since structures of these devices and preparing methods thereof are well known in the art, detailed descriptions thereof will be omitted in this specification.

Advantageous Effects

As described above, in a method of preparing an electrode according to the present disclosure, since an uncoated portion can serve as a buffer space for a coated portion in a rolling process by performing a coating process so that the coated portion is formed with the uncoated portion having a specific pattern shape interposed therebetween, an excellent quality electrode can be prepared by reducing a defect rate at a time at which an electrode is prepared and ensuring that an electrode mixture layer after a rolling process has an overall uniform thickness.

DETAILED DESCRIPTION OF THE PREFERRED EMBODIMENTS

Hereinafter, exemplary embodiments of the present disclosure will be described in detail with reference to the drawings, which are for easing understanding of the present disclosure, and the scope of the present disclosure is not limited thereto.

Figure 1:
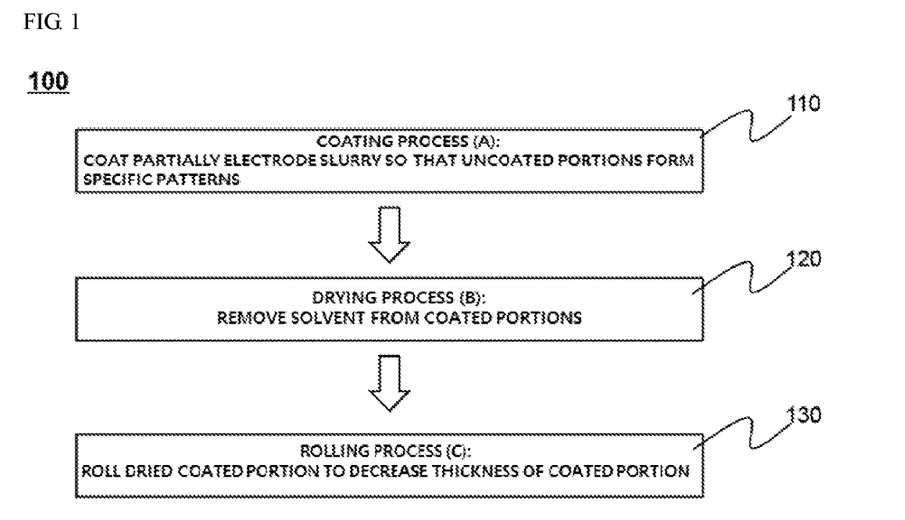
FIG. 1 is a flowchart showing a preparing method according to one embodiment of the present disclosure.

FIG. 1 is a flowchart showing a preparing method according to one embodiment of the present disclosure.

Referring to FIG. 1, a method 100 of preparing an electrode for a secondary battery according to the present disclosure includes, a process 110 of partially coating an electrode slurry containing an electrode mixture and a solvent on an electrode sheet so that coated portions are positioned with an uncoated portion interposed therebetween, a process 120 of drying the coated portion to remove the solvent; and a process 130 of rolling the dried coated portion.

In process 110, the electrode slurry is coated on the electrode sheet so that a coating amount of the electrode mixture is 4 mAh/cm$^2$ or more to prepare a high-capacity electrode. The coating amount is about four times a coating amount of an electrode mixture used in a conventional electrode or more. The electrode and secondary battery prepared according to the preparing method of the present disclosure exhibit a high capacity and improved cycle characteristics.

In a conventional preparing process of an electrode in which no pattern is formed at a time at which an electrode slurry is coated, when such a large amount of an electrode mixture is coated, an electrode mixture layer is discharged from an electrode sheet during a rolling process, and the electrode is bent because a rolling rate of each part of the electrode sheet is different. However, in order to solve this problem, in the preparing method according to the present disclosure, the electrode slurry is coated to form the uncoated portion having a predetermined pattern shape allowing a buffering action during a rolling process in process 110.

During drying in process 120, only 20% by weight to 60% by weight of the solvent added to prepare the electrode slurry is removed, and thus flowability is secured to the extent that the electrode mixture layer may be pushed to the uncoated portion in a rolling process in process 130.

When the coated portions dried in process 130 are rolled, a part of the electrode mixture layer of the coated portion is pushed to the uncoated portion having the pattern shape to fill the uncoated portion, and thus a phenomenon in which the coated portion is discharged from the electrode sheet or the electrode is bent is significantly reduced even at a constant pressure.

Here, the pattern shape of the uncoated portion disappears due to the electrode mixture layer pushed from the coated portion, and a thickness of the uncoated portion filled with the electrode mixture pushed from the coated portion may be a thickness of the rolled coated portion or less. Accordingly, since an electrode having an overall uniform thickness exhibits better performance, it is more preferable for the thickness of the uncoated portion filled with the electrode mixture layer and the thickness of the coated portion from which the electrode mixture layer is partially pushed to be equal.

Although not shown in the views, process 120 may be performed after process 130, in which case all of the solvent in the electrode slurry may be removed.

Figure 2:
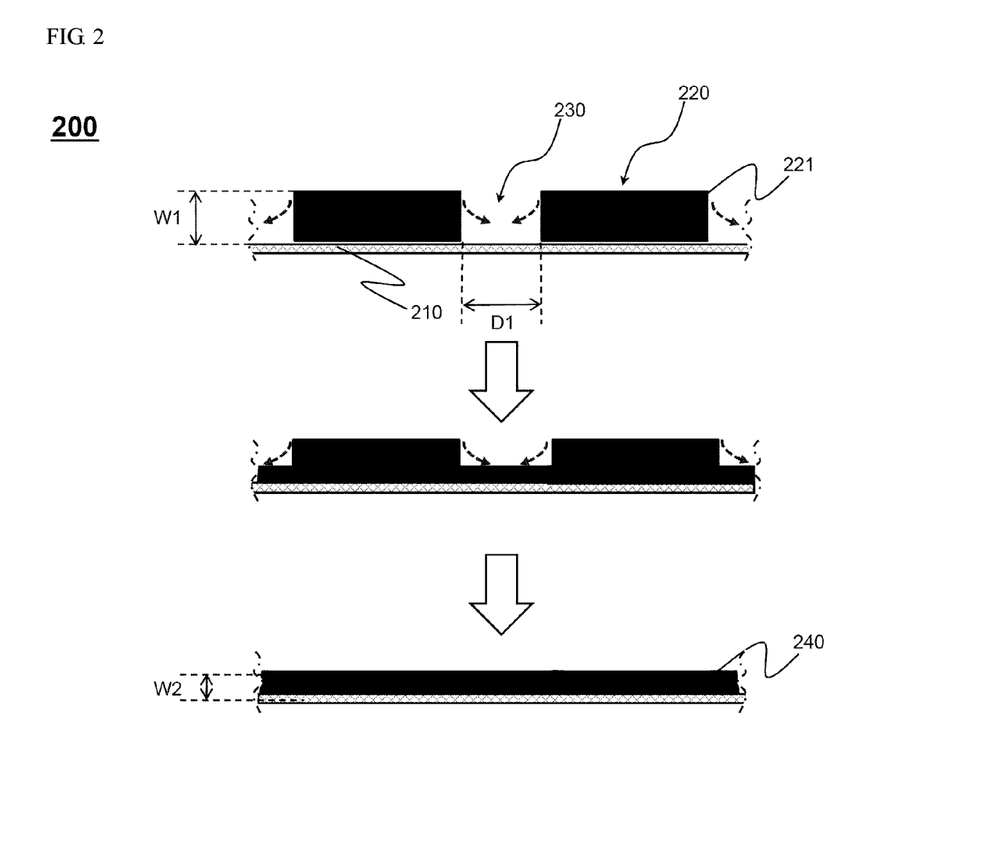
FIG. 2 is a vertical cross-sectional view in a coating direction showing a change in a shape of an electrode prepared by the preparing method according to FIG. 1.
Figure 3:
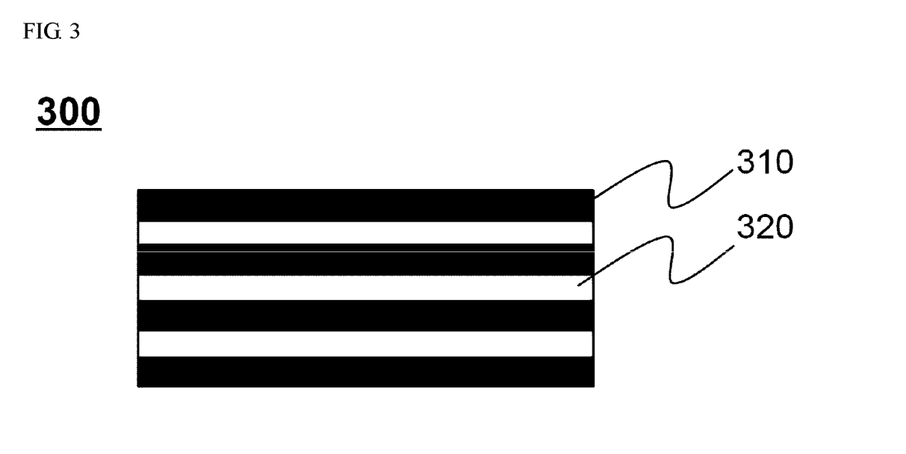
FIGS. 3 to 7 are plan views showing pattern shapes of an electrode mixture according to one embodiment.
Figure 4:
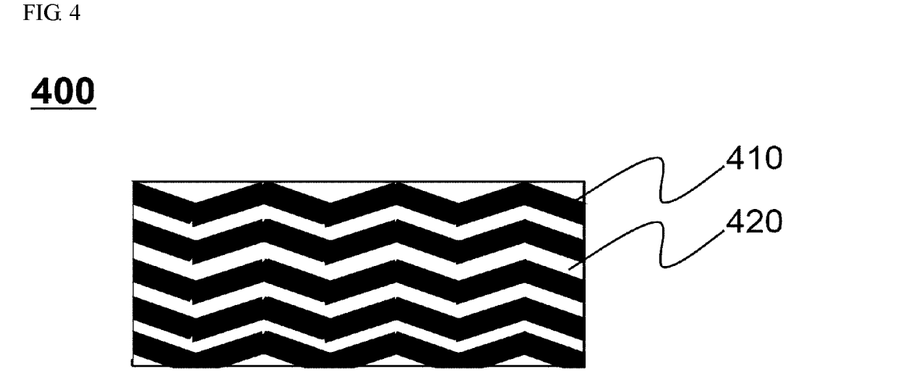
Figure 5:
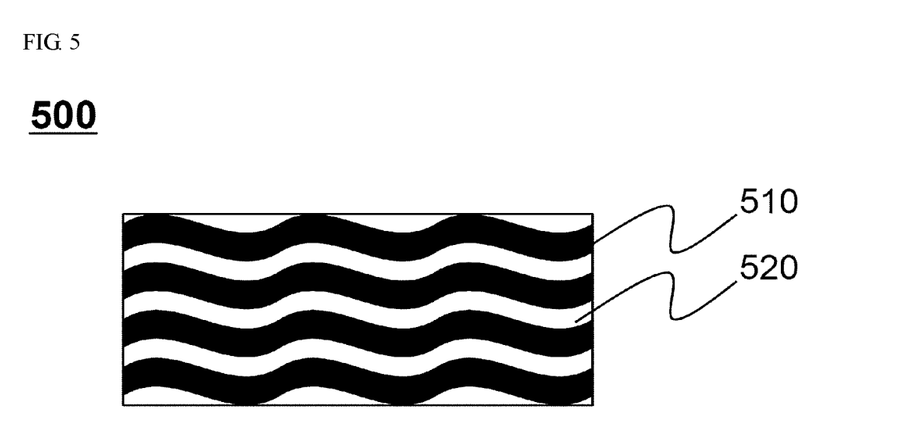
Figure 6:
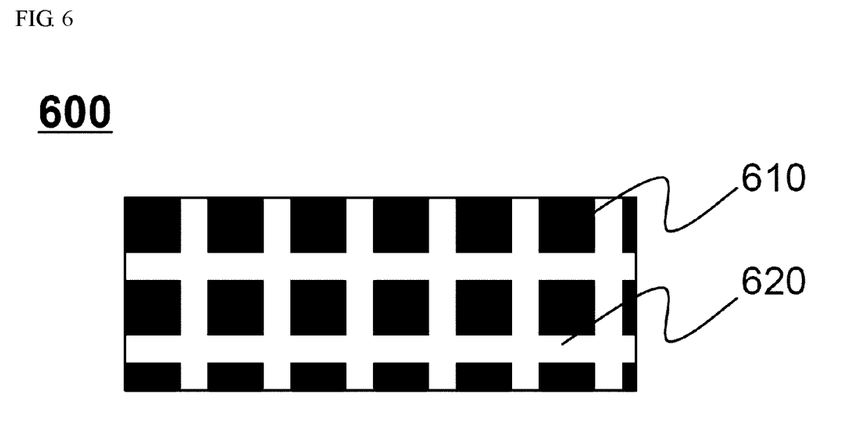
Figure 7:
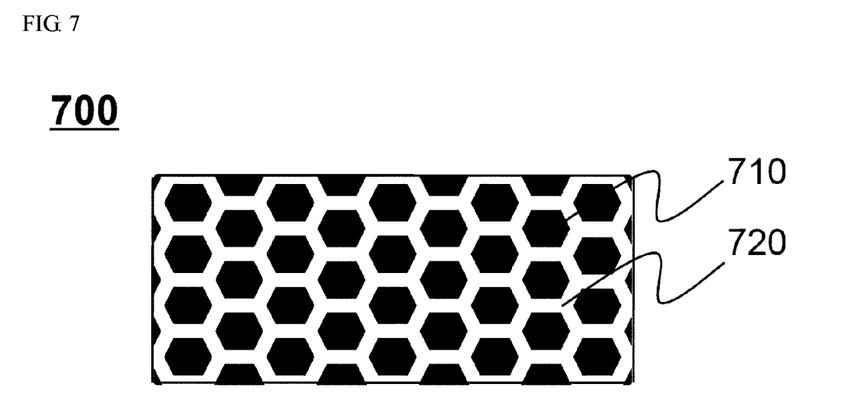

FIG. 2 is a cross-sectional view showing a change in a shape of an electrode prepared by the preparing method according to FIG. 1 on a vertical plane in a coating direction.

FIG. 2 shows electrode preparing method 200. Specifically, in process 110, an electrode slurry 221 is partially coated on an electrode sheet 210 to form a coated portion 220 and an uncoated portion 230. Looking at a side of the electrode sheet, i.e., a vertical cross section of the coating direction, a concavo-convex structure is formed due to the coated portion 220 and the uncoated portion 230 as shown. Here, an interval between the coated portions 220, that is, a width D of the uncoated portion 230, should be secured such that all uncoated portions 230 may disappear while a buffering action occurs between the coated portions 220 during rolling, wherein the width D may be may be 10 μm to 300 μm, may more specifically be 50 μm to 200 μm, and may most preferably be 50 μm to 100 μm.

Afterward, since a part of the electrode mixture layer of the coated portion 220 is pushed to the uncoated portion 230 to fill the uncoated portion 230 as shown by movement of arrows, a thickness W1 of the coated portion 220 is gradually decreased, as a result, the coated portion 240 having an overall uniform height may be formed in a state in which the uncoated portion 230 is rolled and disappears.

Here, in order to finally form an electrode 240 having a uniform thickness and size, the thickness of the uncoated portion filled with the electrode mixture layer is preferably equal to a thickness W2 of the electrode mixture layer of the rolled coated portion. However, although not shown, the thickness of the uncoated portion which disappeared may be smaller than the thickness W2 of the electrode mixture layer of the rolled coated portion.

A linear pressure at a time at which the dried coated portion is rolled may be 0.5 to 3.5 ton/cm, may more preferably be 1 to 3 ton/cm, and may most preferably be 1 to 2 ton/cm. It is not preferable for the linear pressure to be less than 0.5 ton/cm during rolling in terms of the uniformity of the electrode. When the linear pressure exceeds 3.5 ton/cm, the electrode may be broken.

The number of times the dried coated portion is rolled is preferably 1 to 3. When the number of times exceeds 3, the electrode mixture may be broken, which is not preferable.

Specifically, the thickness W2 of the electrode mixture layer of the rolled coated portion may be 100 μm to 300 μm, may preferably be 110 μm to 250 μm, and may most preferably be 130 μm to 200 μm. It is not preferable for the thickness of the electrode mixture layer of the rolled coated portion to be less than 100 μm in terms of preparing a high capacity and performance electrode, and it is not preferable for the thickness of the electrode mixture layer of the rolled coated portion to exceed 300 μm in terms of electrolyte impregnation.

The thickness of the electrode mixture layer of the coated portion after rolling may be 30% to 80% of the thickness of the electrode mixture layer of the coated portion before rolling, may more preferably be 40% to 75%, and may most preferably be 50% to 70%.

FIGS. 3 to 7 are plan views showing pattern shapes of an electrode mixture according to one embodiment.

Referring to FIGS. 3 to 7, an electrode mixture is coated on an electrode sheet so that uncoated portions 320 are formed between coated portions 310, uncoated portions 420 are formed between coated portions 410, uncoated portions 520 are formed between coated portions 510, uncoated portions 620 are formed between coated portions 610, or uncoated portions 720 are formed between coated portions 710 to form pattern shapes 300, 400, 500, 600, or 700 of the uncoated portions. Specifically, the pattern shapes 300, 400, 500, 600, or 700 of the uncoated portions may have a straight shape 300, a zigzag shape 400, a wavy pattern shape 500, a lattice pattern shape 600, or a honeycomb shape 700, but are not limited thereto, and an electrode slurry may be coated on the electrode sheet to form a specific pattern at intervals such that the uncoated portions disappear during rolling.

Figure 8:
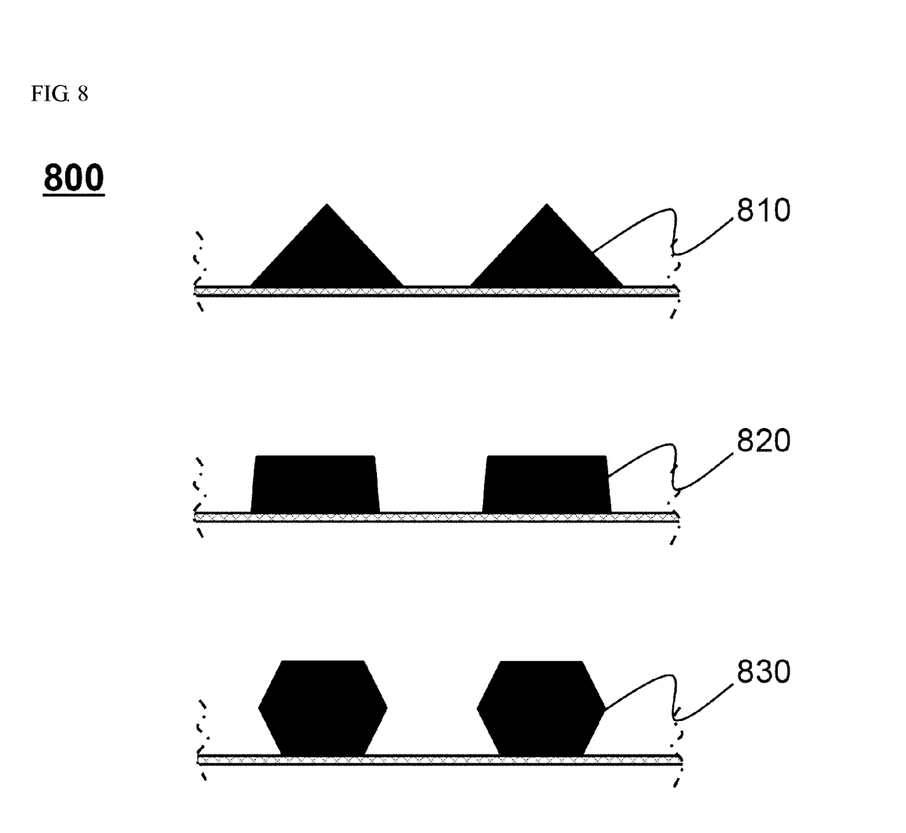
FIG. 8 is a vertical cross-sectional view in the coating direction showing a shape of a coated portion according to another embodiment.

FIG. 8 is a vertical cross-sectional view of coated electrode sheets 800 in the coating direction showing a shape of a coated portion according to another embodiment. Each of the coated portions formed by the pattern shapes 300, 400, 500, 600, and 700 of the uncoated portions according to FIGS. 3 to 7 may have various shapes on a plane apart from the patterns shapes 300, 400, 500, 600, and 700 of the uncoated portions, specifically, the coated portions may have a triangular shape 810, a quadrangular shape 820, or a hexagonal shape 830. In addition, the coated portion may have various shapes, and in the preparing method according to the present disclosure, various discharge members or methods may be used when coating the electrode slurry on the electrode sheet.

As described above, when a electrode for a secondary battery is prepared by the preparing method according to the present disclosure, a phenomenon in which a electrode mixture layer is discharged from an electrode sheet or a phenomenon in which a rolled electrode is bent is minimized, and thus it is possible to significantly reduce a preparation defect rate and to prepare a high capacity and efficiency electrode.

It should be understood by those skilled in the art that various changes may be made without departing from the spirit and scope of the present disclosure.

The invention claimed is:

1. A method of preparing an electrode for a secondary battery comprising: (a) a process of partially coating an electrode slurry containing an electrode mixture and a solvent on an electrode sheet so that coated portions are positioned with uncoated portions such that an uncoated portion is interposed between coated portions;

(b) a process of drying the coated portions to remove the solvent; and (c) a process of rolling the dried coated portions, wherein thicknesses across the entire surface of the coated portions are decreased as a portion of the electrode mixture moves from the coated portions into the uncoated portions, resulting in filling the uncoated portions, in the process (c), wherein a solvent removed in the process (b) is 20% to 60% by weight of the amount of the solvent initially added to prepare the electrode slurry, and wherein processes (a), (b), and (c) are performed in sequential order.

2. The method of claim 1, wherein a coating amount of the electrode mixture is 4 mAh/cm$^2$ or more in the electrode prepared by rolling in the process (c).

3. The method of claim 1, wherein a plurality of coated portions is formed on the electrode sheet by the uncoated portion of a pattern shape in the process (a).

4. The method of claim 3, wherein patterns of the uncoated portions have a straight line shape, a zigzag shape, a wave pattern shape, a lattice pattern shape, or a honeycomb shape on a plane.

5. The method of claim 3, wherein each of the coated portions has a triangular shape, a quadrangular shape or a hexagonal shape on a plane.

6. The method of claim 1, wherein, in the process (a), a width of the uncoated portion is 10 μm to 300 μm.

7. The method of claim 1, wherein the coating process of the process (a) is implemented through one method selected from the group consisting of nozzle scanning, die coating, comma coating, and screen printing.

8. The method of claim 1, wherein a thickness of the electrode mixture layer in an uncoated portion which disappeared due to movement of the electrode mixture is the thickness of the electrode mixture layer of the coated portion or less.

9. The method of claim 1, wherein the thickness of the electrode mixture layer of the coated portions after rolling in step (c) is 100 μm to 300 μm.

\* \* \* \* \*